United States Patent
Chu (10) Patent No.: US 7,661,593 B2
(45) Date of Patent: Feb. 16, 2010

(54) MOVING COIL ACTUATOR WITH EXPANDABLE RANGE OF MOTION

(75) Inventor: Daniel Y. Chu, Hercules, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 843 days.

(21) Appl. No.: 11/291,423

(22) Filed: Nov. 30, 2005

(65) Prior Publication Data

US 2007/0119945 A1    May 31, 2007

(51) Int. Cl.
G06K 7/14    (2006.01)
(52) U.S. Cl. ...................................... 235/454
(58) Field of Classification Search ................................
235/462.001–462.49, 454
See application file for complete search history.

(56) References Cited

U.S. PATENT DOCUMENTS

| 4,516,062 | A | 5/1985 | La Fiandra et al. |
| 4,913,155 | A * | 4/1990 | Dow et al. .................. 600/446 |
| 5,134,326 | A | 7/1992 | Sakamoto |
| 5,459,325 | A | 10/1995 | Hueton et al. |
| 6,355,934 | B1 | 3/2002 | Osgood et al. |
| 6,710,353 | B1 | 3/2004 | Loopstra |
| 6,932,274 | B2 * | 8/2005 | Dvorkis ................. 235/462.36 |
| 2008/0160500 | A1 * | 7/2008 | Fuller et al. ..................... 435/4 |

* cited by examiner

*Primary Examiner*—Jamara A Franklin
(74) *Attorney, Agent, or Firm*—Townsend and Townsend and Crew LLP; M. Henry Heines (57) ABSTRACT

A moving coil actuator contains a magnet assembly that is movable to shift the range of motion of the coil. The magnet assembly moves between two or more positions along a path of travel that is parallel to the path of travel of the reciprocating motion of the coil. With this feature, the width of an area scanned by a scanning head affixed to the coil can be increased by multiples allowing a simple moving coil actuator to be used for any scanning width.

14 Claims, 7 Drawing Sheets

MOVING COIL ACTUATOR WITH EXPANDABLE RANGE OF MOTION

BACKGROUND OF THE INVENTION

1. Field of the Invention

This invention relates to scanning systems for microarrays of biological species such as nucleic acids or proteins, and for any type of procedure or analysis where very rapid illumination, observation, and/or detection are performed at a large number of individual sites arranged in a spatial array. In particular, this invention relates to moving coil actuators and is of particular interest in connection with the use of such actuators as a driving mechanism for a mobile optical system.

2. Description of the Prior Art

Microarrays are two-dimensional arrays of sites where chemical or biochemical assays are performed, each site often being of microscopic dimensions, with an independent assay and often a different molecular species at each site. These arrays are formed on a variety of substrates, including glass slides, microtiter plates, and membranes. One of the widest uses of microarrays is in binding assays for the identification or characterization of an unknown biological species or the analysis of a sample to determine where the sample contains species with certain binding affinities. The size, number and spacing of the sites in a microarray can vary considerably, depending on nature of the individual species and the procedures to be performed. The sites can be the wells in a standard microtiter plate which has 96 wells in a 12×8 array with a spacing of 9 mm between wells. At the other extreme, the microarray can be formed on a single glass slide with a width of only 25 mm, where the sites are printed on by automated microprinting techniques. As many as 10,000 genes can be printed on a glass slide in this manner.

The monitoring of assay progress in a microarray and the detection of assay results often includes excitation by exposure of each site to incident radiation followed by, or simultaneous with, the detection and measurement of radiation emitted from the sites in response to the excitation. These functions are typically performed by an optical system with a scanning head, typically one equipped with a laser. Scanning systems often incorporate moving coil actuators to move the scanning head across the array, since these actuators can be operated at high speed, are simple and inexpensive to manufacture, can readily meet performance requirements, and are easy to control. The scanning head, which is the "payload" transported by the actuator, may include a mirror and lens assembly plus holders and bearings, or it may be a laser with detector optics. A moving coil actuator utilizes the well-known Lorentz force to drive the coil at high speed and with a high degree of control to meet precise specifications. The moving coil actuators that are commonly used for scanning heads are voice coil actuators, which are direct-drive, limited-motion devices that utilize a permanent magnetic field and an electric coil to produce a force proportional to the current applied to the coil. Examples of voice coil actuators in current use include various products from the Kimco Magnetics Divison of BEI Technologies, Inc., San Marcos, Calif., U.S.A., and from H2W Technologies, Inc., Valencia, Calif., U.S.A. Disclosures of voice coil actuators are found in U.S. Pat. Nos. 6,894,408, 6,870,285, 6,815,846, and 6,787,943.

For high-speed scanning, the moving parts must be limited to those of low inertia, and this is typically achieved by making the coil mobile and the magnet and magnet housing fixed. The length of travel of the coil is limited however, either by the length of the coil or the length of the magnet. As a result, the typical microarray scanner is only capable of scanning a width of about 1 inch (approximately 25 mm). The same scanner cannot be used effectively to scan a wider array such as that formed on a microtiter plate. Conversely, if an actuator is used for scanning an array whose width is narrower than the width for which the actuator is designed, either the coil will be traveling a greater distance than that needed for scanning the microarray or the system will require costly sensors and controls to limit the travel of the coil to a narrower width, with the added burden of additional mass.

SUMMARY OF THE INVENTION

These and other limitations of the prior art are addressed by the present invention, which resides in a moving coil actuator in which the magnet assembly is movable to shift the range of motion of the coil. Actuators of this invention thus include a coiled electrical conductor and a magnet assembly with magnetic poles separated by a gap large enough to receive the coiled conductor and to allow the conductor to move in a reciprocating (back-and forth) manner. The coil is mounted to a carrier and is connected to a power source that produces an electric current of alternating direction through the coil. The magnet assembly moves between two or more positions along a path of travel that is parallel to the path of travel of the reciprocating motion of the coil. The result is that the scanning range of the coil can be shifted by distances equal to the separation between the various positions of the magnet assembly. The coil and magnet assembly are moved independently, and each is operated while the other is held stationary. Thus, in any of various movement sequences and scanning schemes, the magnet assembly is first placed in a position that allows movement of the coil over a portion of the microarray and the coil is moved within that portion. The magnet assembly is then shifted to a different position corresponding to another portion of the microarray and the coil is moved within that portion. In some applications, two positions of the magnet assembly will suffice to cover the full width of the microarray, while in others three or more positions may be needed. In general, the magnet assembly is shifted a sufficient number of times to cover the full width of the microarray. In some applications, the magnet assembly, after occupying the second or subsequent positions, can be returned to its original position for further scanning by the coil.

By the practice of this invention, therefore, a moving coil actuator can be used and programmed for use in scanning microarrays of any of a variety of widths, thereby providing a scanning system with both versatility and efficiency. Still further advantages, embodiments, features, and objects of the invention will be apparent from the description that follows.

DETAILED DESCRIPTION OF THE INVENTION AND PREFERRED EMBODIMENTS

While the features defining this invention are capable of implementation in a variety of moving coil actuator designs, the invention as a whole will be best understood by a detailed examinations of a specific embodiment. One such embodiment is shown in the drawings.

Figure 1A:
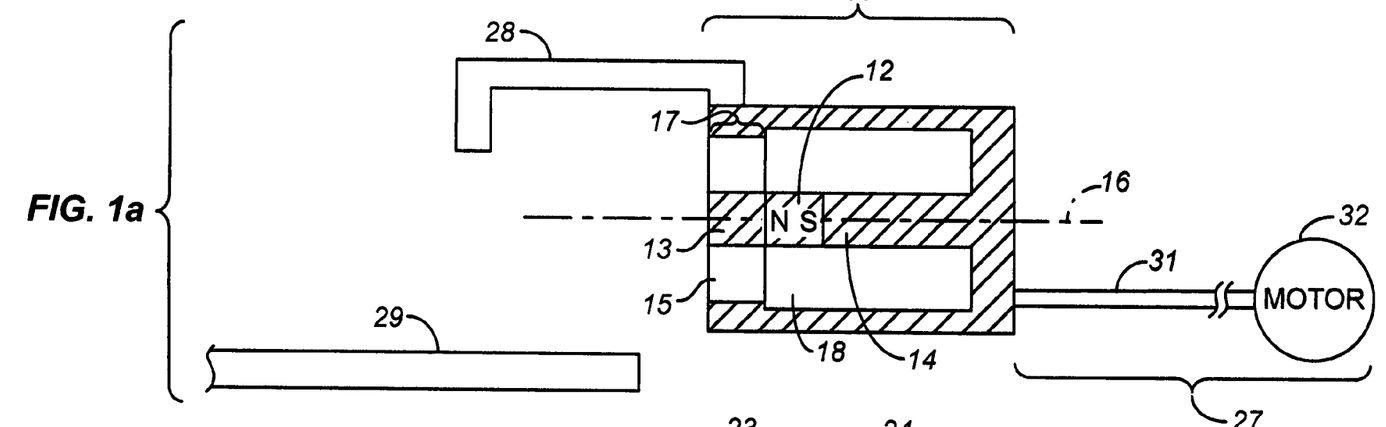
FIG. 1a is a cross section of a magnet assembly constituting part of a moving coil actuator of the present invention.
Figure 1B:
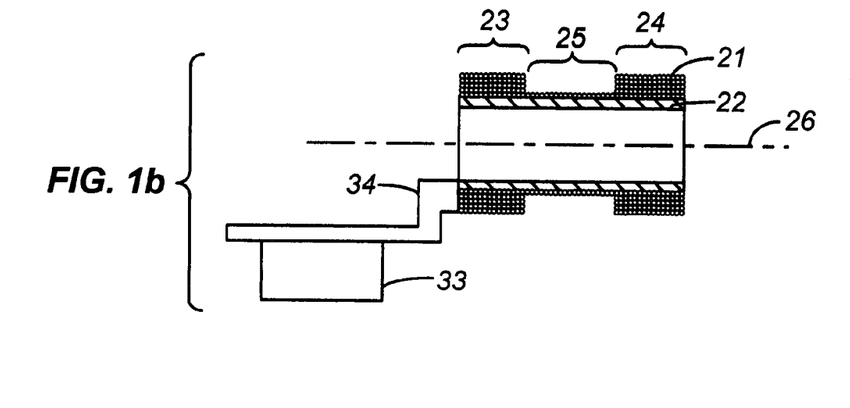
FIG. 1b is a cross section of a coil and coil carrier constituting further parts of a moving coil actuator of the present invention.

FIGS. 1a and 1b depict the components of a moving coil actuator in accordance with the present invention. FIG. 1a depicts the components of the actuator that remain stationary during the movement of the coil plus associated components of the optical system that likewise remain stationary, while FIG. 1b depicts the coil itself, the coil carrier, and components attached to the coil carrier. The actuator components of FIG. 1a are those of the magnet assembly 11 which itself consists of a magnet 12 and pole pieces 13, 14, the pole pieces forming a gap 15 and imposing a magnetic flux across the gap. Each pole piece is formed of a material that is conductive of magnetic flux, with iron as an example of such material. The magnet 12 and pole pieces 13, 14 are bodies of revolution about a common axis 16, and the view shown in FIG. 1a is a cross section along a plane that includes the axis. Shapes other than bodies of revolution can be used as well. The gap 15 is an annular space that encircles the magnet 12 and one of the pole pieces 13.

FIG. 1b shows the coil 21 wound around a coil carrier 22. In this embodiment, the coil 21 is a complex coil consisting of two regions of high winding density 23, 24 separated by a region of low winding density 25. The high winding density is achieved by multiple winding layers, while the low winding density is achieved by a single winding layer. The widths of the two regions of high winding density 23, 24 match the width of a region of concentrated flux 17 formed by a narrowing of the gap 15 near the open end of the gap. The function and advantages of this arrangement of the winding density and flux concentration as well as similar arrangements are disclosed in co-pending, commonly owned U.S. patent application Ser. No. 11/265,000, filed Nov. 1, 2005, inventors Paul J. Patt et al., entitled "Moving Coil Actuator for Reciprocating Motion With Controlled Force Distribution," the contents of which are incorporated herein by reference. The carrier 22 is a thin-walled, and therefore light-weight, cylinder around which the coil is wound. The carrier 22 and hence the coil 21 are bodies of revolution about a common axis 26, and the view shown in FIG. 1b is a cross section along a plane that includes the axis. The two regions 23, 24 of high winding density are spaced apart along the axis.

The gap 15 (FIG. 1a) is wide enough to receive the coil 21 and coil carrier 22, and forms a cavity 18 within the magnet assembly that is long enough to permit the coil and carrier to move back and forth within the magnet housing (as shown in the succeeding Figures and discussed below). With the coil and carrier inside the magnet assembly, the coil axis 26 and the magnet axis 16 coincide to form a common axis.

Additional components shown in FIG. 1a are a drive mechanism 27 for moving the magnet housing, an extension arm 28 to engage the coil carrier when the magnet housing is moved, and a fixed rail 29 to serve as a stabilizer and guide for the movement of the coil and the scanning head attached to the coil. The drive mechanism 27 in this embodiment includes a screw drive 31, a motor 32 to operate the screw drive and move the magnet assembly 11 to the left and right in the view shown in the Figure, and a controller (not shown) to govern the motor. The motor 32 can be any conventional motor that can operate a screw drive, preferably to a high degree of precision. Any of a variety of common stepper motors and dc motors can be used. Alternatively, a motor that turns a spur pinion and drives a rack that is connected to the magnet housing can be used. In FIG. 1b, the additional components shown are a sliding member 33 to engage the fixed rail 29 and a linkage arm 34 joining the sliding member 33 to the coil carrier 22. A scanning head that includes a mirror and lens assembly and all other optical components that move across the microarray during scanning is affixed to the sliding member 33.

Figure 2:
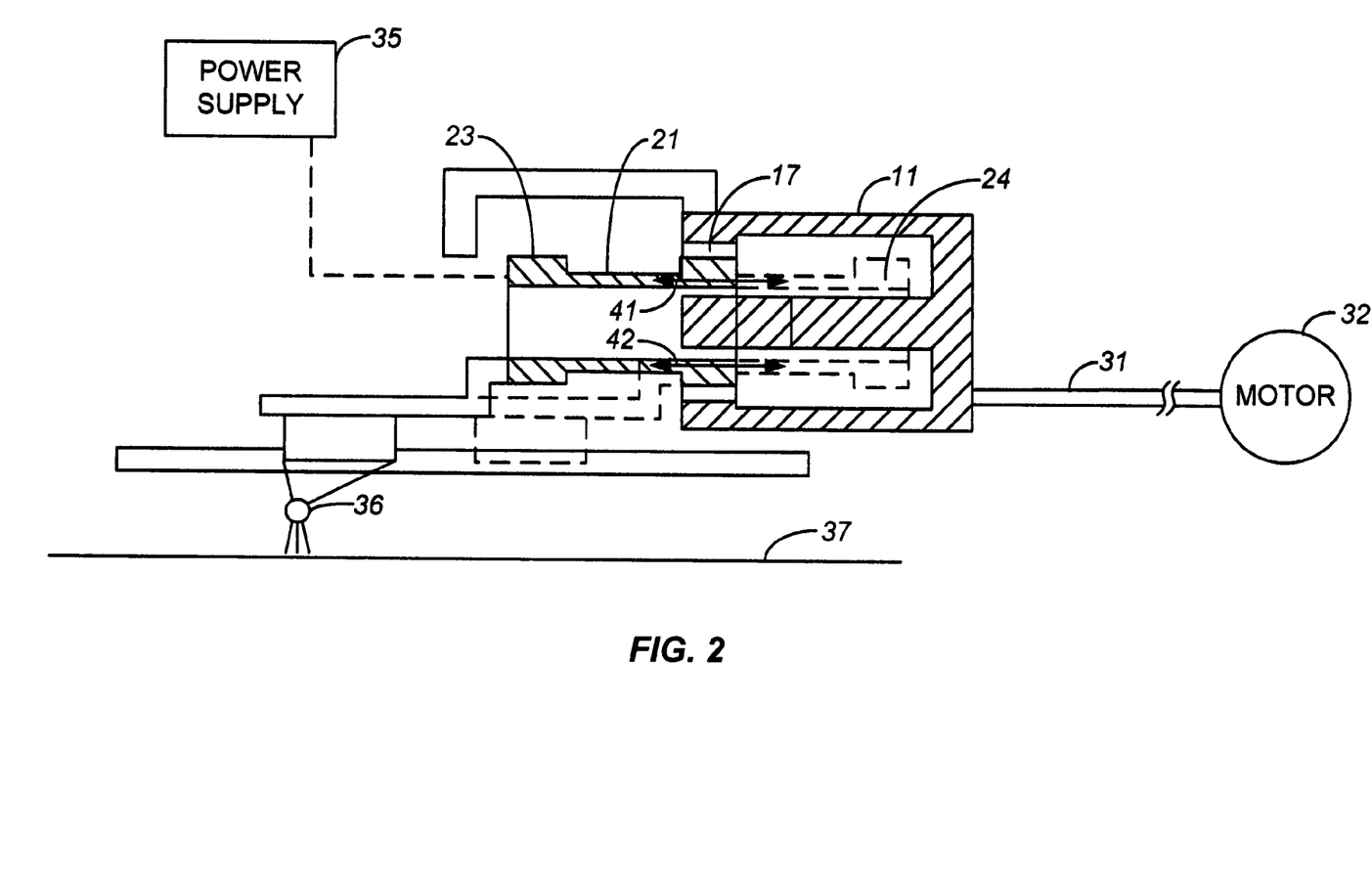
FIG. 2 is a cross section of the assembled parts of FIGS. 1a and 1b with an alternating current flowing through the coil for scanning a first portion of the microarray width.

FIG. 2 depicts the assembled components of FIGS. 1a and 1b in position for a left-to-right reciprocating movement of the coil (and a corresponding left-to-right scan by the scanning head) at a first position of the magnet assembly. A power supply 35 is connected to the coil 21, a scanning head 36 is affixed to the sliding member 33, and a microarray 37 is shown below the scanning head 36. (The power supply 35, scanning head 36, motor drive mechanism 31, 32 and microarray 37 are represented symbolically. The magnet housing rides on simple guide rails which are not shown.) The two extreme ends of the range of travel of the coil 21 are shown, one end in solid lines and the other in dashed lines. The arrows 41, 42 indicate the back-and-forth direction of the coil in response to the alternating current supplied by the power supply. At each of the two ends of the range of travel, one of the two regions of high winding density 23, 24 of the coil resides within the region of concentrated magnetic flux for maximum efficiency in the operation of the moving coil, as set forth in the commonly owned, co-pending application referenced above.

Figure 3A:
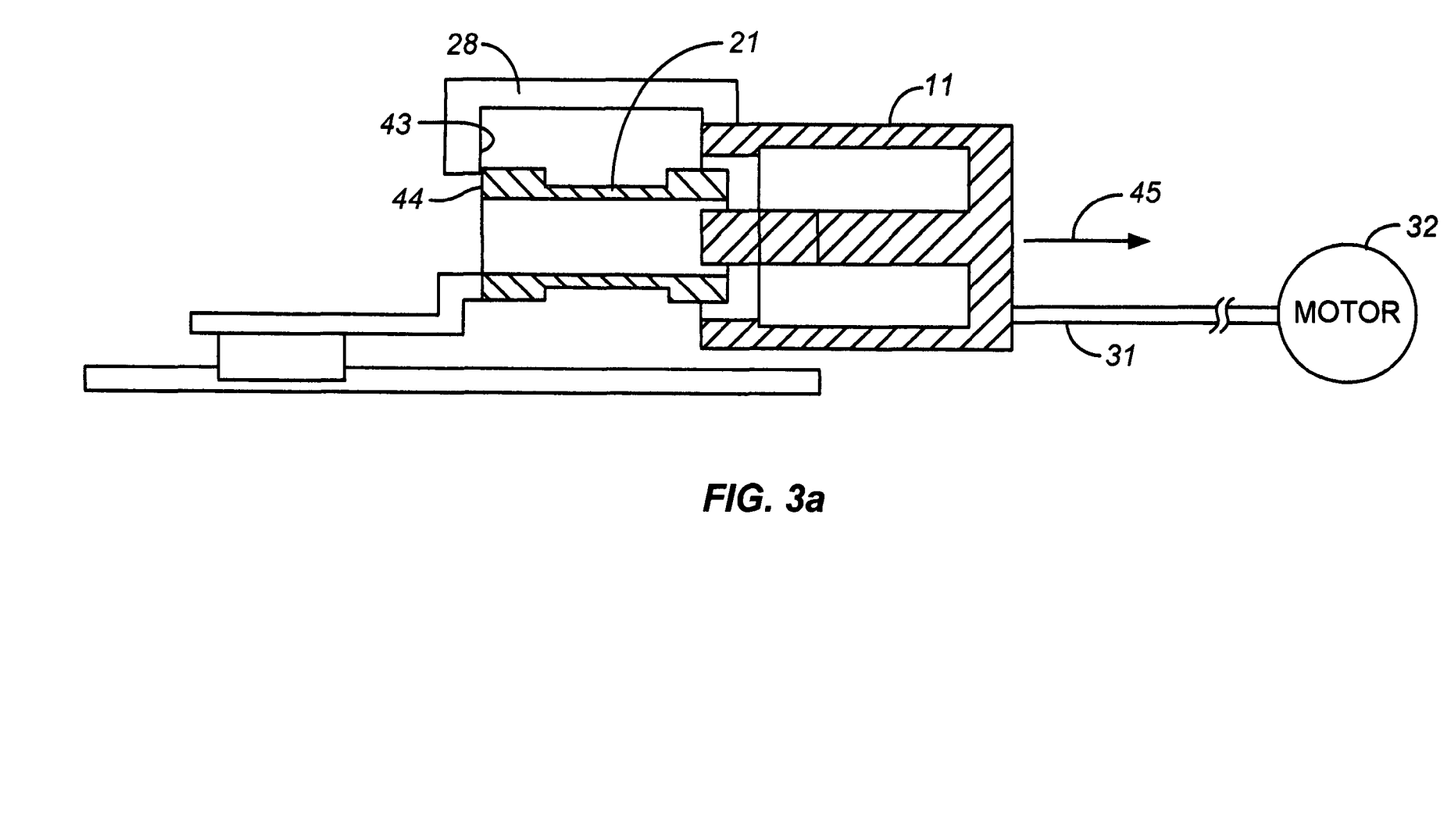
FIG. 3a is a cross section of the unit of FIG. 2 with the current through the coil turned off and the magnet assembly moved so that a shoulder contacts the coil in preparation for moving to a second position.
Figure 3B:
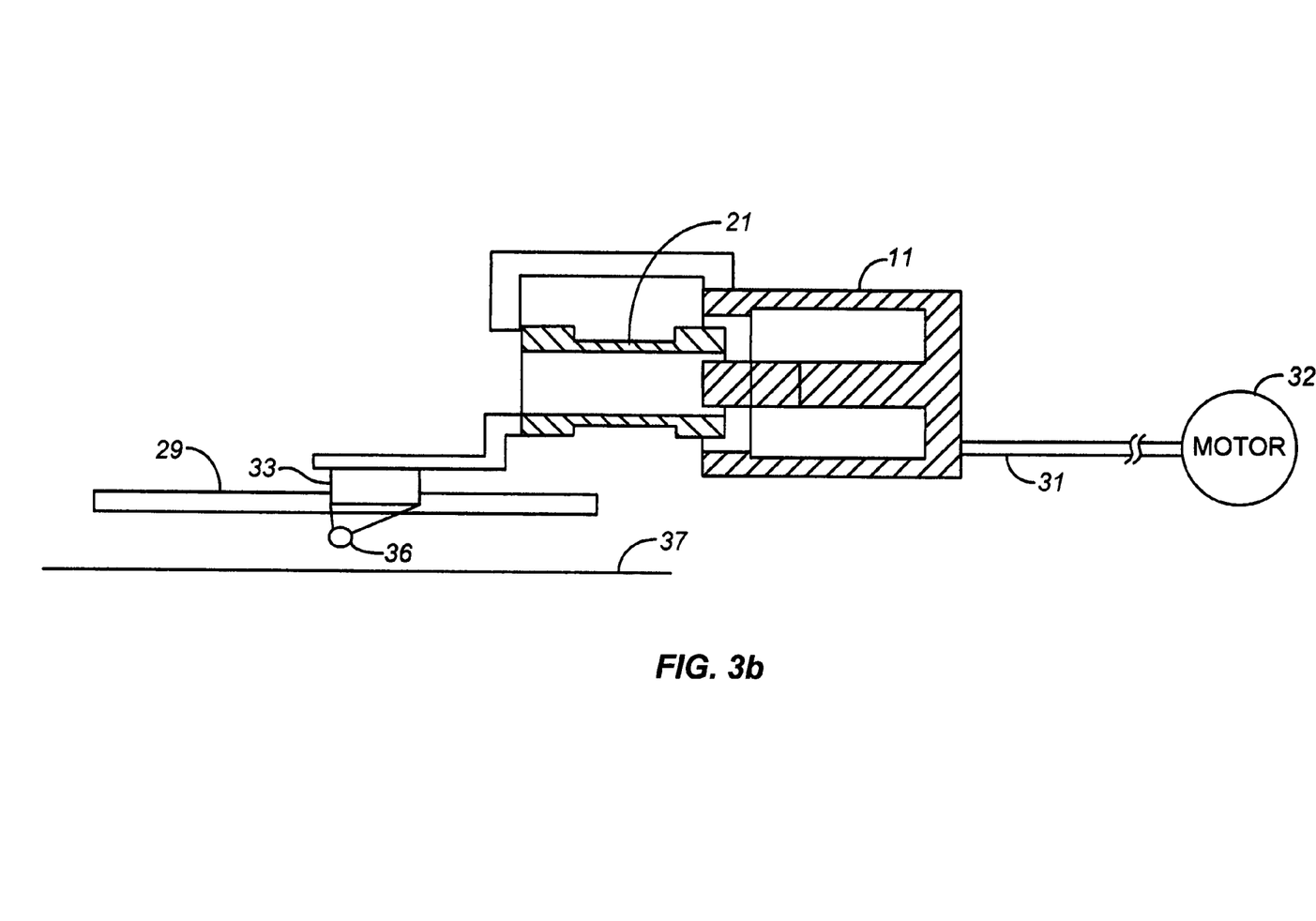
FIG. 3b is a cross section of the unit of the preceding Figures with the magnet assembly bringing the coil and carrier to a stop at the second position.
Figure 4:
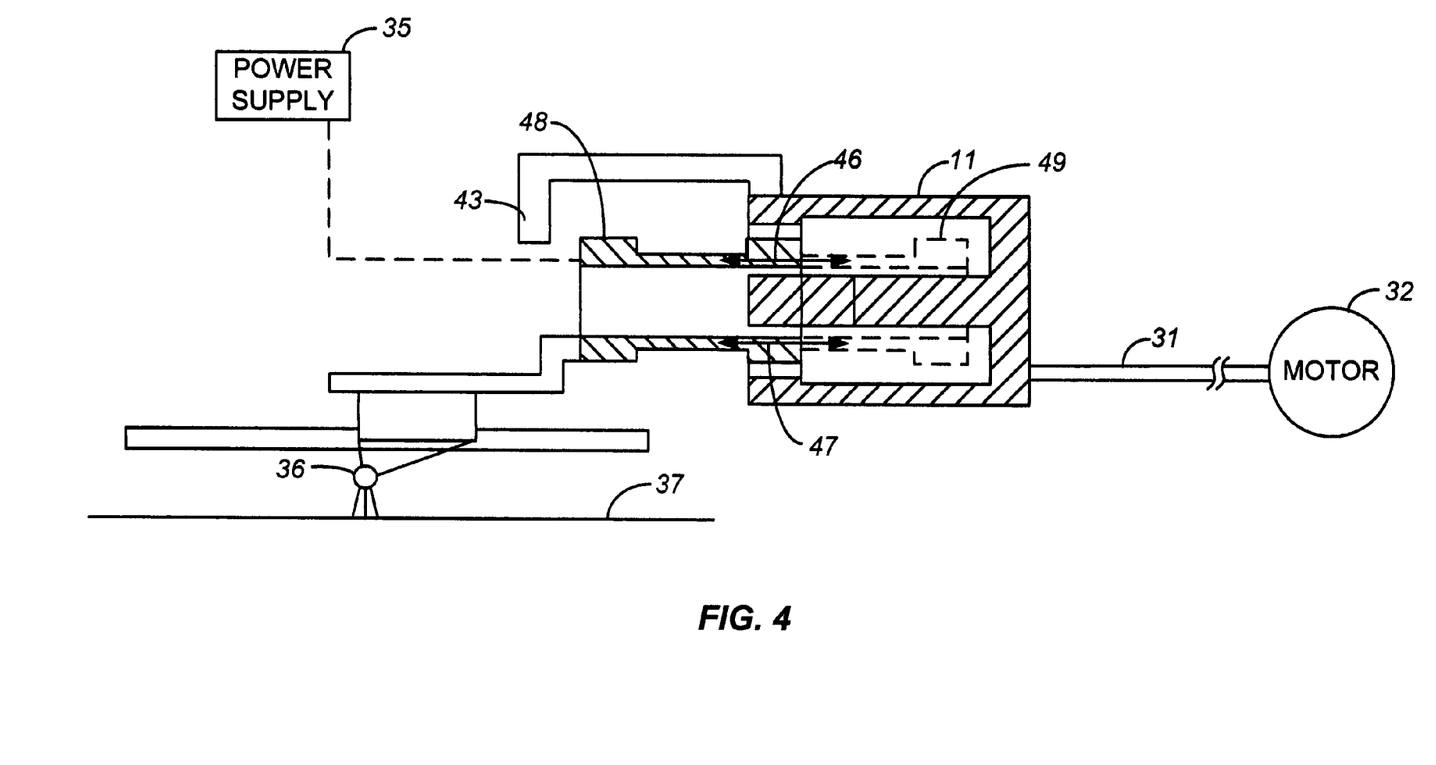
FIG. 4 is a cross section of the unit of the preceding Figures with the magnet assembly at the second position but moved back slightly to allow the coil to oscillate without contacting the magnet assembly. An alternating current flows through the coil for scanning a second portion of the microarray width.

Upon the completion of scanning in the position of the magnet assembly shown in FIG. 2, the current through the coil 21 is turned off and the magnet assembly 11 is shifted to a new position. To initiate this shift, the motor 32 and drive screw are energized to move the magnet assembly into the position shown in FIG. 3a, where a shoulder 43 on the extension arm 28 of the magnet assembly abuts the exposed end 44 of the coil 21 or the coil carrier. Once the extension arm and coil (or coil carrier) are in contact, the magnet assembly 11 is moved further in the same direction, as indicated by the arrow 45, parallel to the linear path of travel of the coil shown in FIG. 2. During this shift, the magnet assembly 11 and the coil 21 move as a unit to a new position as shown in FIG. 3b. Also during this shift of the magnet assembly and coil, the sliding member 33 travels along the fixed rail, and the scan head 36 shifts to a new portion of the microarray 37. The magnet assembly is then retracted slightly in the opposite direction to disengage the shoulder 43 from the coil 21 to achieve the configuration shown in FIG. 4. The power supply is then re-energized to once again supply an alternating current to the coil. Scanning accordingly proceeds at the new position. As in FIG. 2, the reciprocating movement of the coil in the FIG. 4 configuration is indicated by the arrows 46, 47, and the two extreme ends 48, 49 of the range of travel of the coil 21 in FIG. 4 are shown in solid and dashed lines, respectively.

Figure 5:
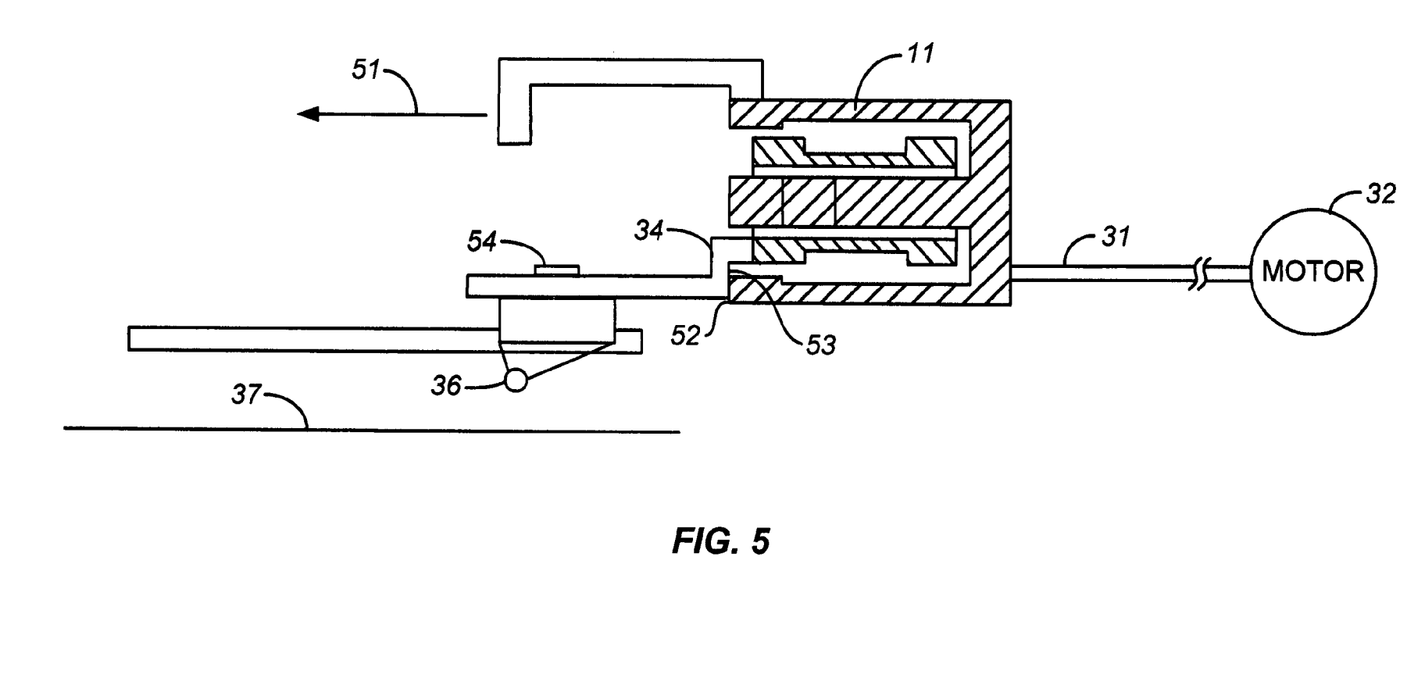
FIG. 5 is a cross section of the unit of the preceding Figures with the current through the coil turned off and the magnet assembly prepared for returning to the position of FIG. 2.

If return of the magnet assembly and coil to their original positions is sought after scanning at this second position, the power to the coil is once again turned off, and with the components in the positions shown in FIG. 5, the motor 32 is reversed and the screw drive 31 moves the magnet assembly 11 in the direction of the arrow 51 back toward its first position. In the particular construction shown, an exposed edge 52 of the magnet assembly abuts an exposed surface or shoulder 53 on the linkage arm 34 affixed to the coil carrier causing the coil 21 and the magnet assembly 11 to once again move as a unit. FIG. 5 also shows a sensor 54 mounted to linkage arm 34 to transmit a signal representative of the position of the coil and hence the scanning head. Examples of suitable sensors are digital and analog Hall-effect position sensors, magnetoresistive digital sensors, Hall-effect vane sensors, and magnets.

The present invention is contemplated for use in the scanning of microarrays of a wide variety of dimensions and configurations. The most typical microarrays for this invention will be those that are two-dimensional such as that shown in FIG. 6, with reaction sites or spots arranged in rows 1, 2, 3, etc. and columns A, B, C, etc. For these microarrays, the reciprocating movement of the coil and scan head will traverse rows in succession, first moving linearly across a row in the x-direction, then shifting an increment of distance in the y-direction by a separate drive mechanism and guides to the next adjacent row, then moving across that row in the x-direction, and repeating the sequence until all rows are scanned. The movement of the magnet assembly will also be in the x-direction, augmenting the scanning range to adapt the unit for use on microarrays with rows of different widths. In general, current will flow through the coil only when the magnet assembly is stationary, and the motor driving the magnet assembly between scanning positions will operate only when the current through the coil is turned off.

Figure 6:
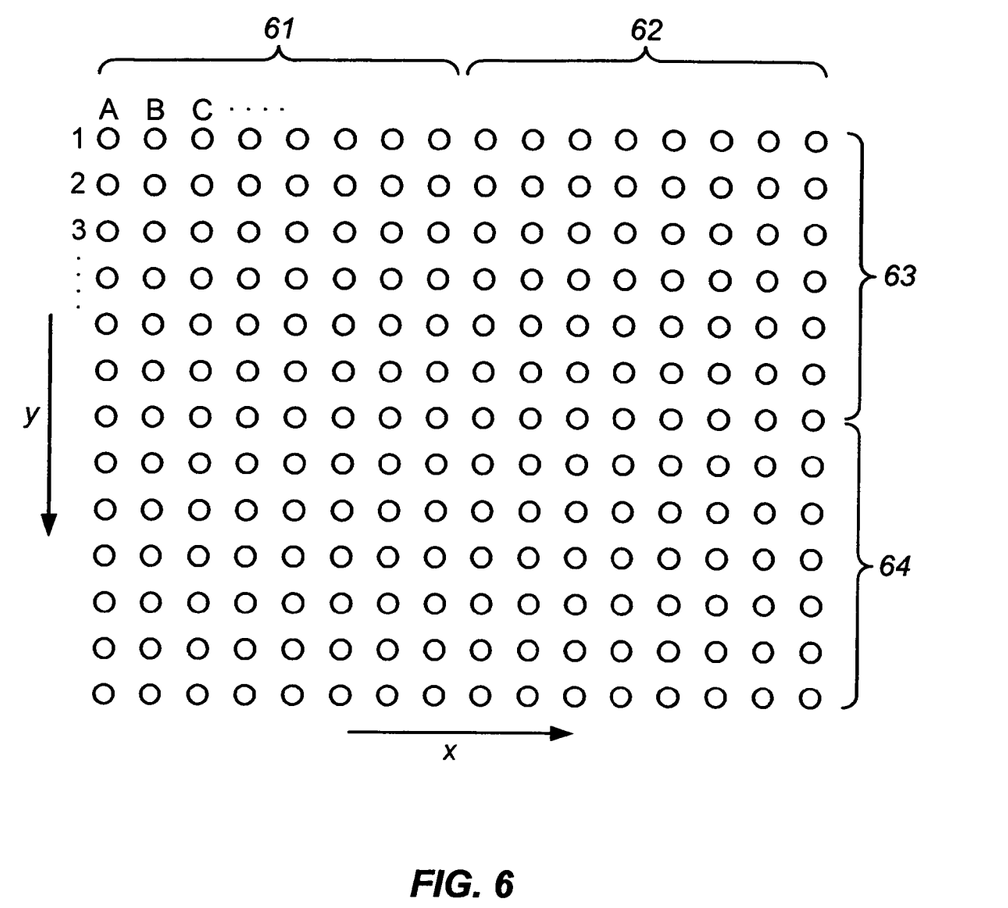
FIG. 6 is a representation of a two-dimensional microarray to be scanned by a scanning head whose position and motion along one axis can controlled by the unit of the preceding Figures.

While the individual movements of the coil and the magnet assembly will be coordinated in a manner that will result in scanning of the entire microarray, a variety of sequences of the two movements can be used, and the particular sequence to be used in any given application is not critical to the invention. In certain implementations, the magnet housing will remain stationary while the coil and thus the scan head travel in a reciprocating motion in a plurality of cycles, drawing the scan head across a multitude of rows covering all rows but only a portion 61 of the total number of columns and hence a portion of the width of the microarray. Once this is done, the motor driving the magnet assembly will be activated to move the magnet housing to a second portion 62 of the microarray width immediately adjacent to the first. Scanning is then performed at this location in a plurality of cycles covering all rows but only in a second portion of the total number of columns. This can be repeated for as many portions as needed to cover the entire width of each row, each time moving the magnet assembly successively further from the original position. The groups of columns in each of the various portions scanned between movements of the magnet assembly will typically be immediately adjacent and scanned in succession. Alternatively, the unit may scan only a portion 63 of the total number of rows (in addition to a portion of the total number of columns) before the magnet assembly is moved to a new position where another portion 64 of the total number of rows is scanned. If desired, the unit can also scan an entire single row in portions, by alternating between passing a current through the coil and energizing the motor controlling the position of the magnet assembly, before moving to the next row. For maximum speed, accuracy, and efficiency, however, the preferred protocol is one in which the coil is energized to produce a multitude of back-and-forth traversals and thereby scan portions of a multitude of rows before the magnet assembly is moved.

As noted above, the coil in the actuator shown in the drawings hereto is one whose description is found in the above-referenced U.S. patent application Ser. No. 11/265,000. In this actuator, the magnetic flux is concentrated in a region whose length is less than the combined lengths of the two coil regions of high winding density. These two high-density coil regions are preferably of equal winding density and separated by a region of lower winding density, as shown in FIG. 1b. The two high-density coil regions are preferably equal in length, and the concentrated magnetic flux region is preferably equal in length to each of the two high-density regions. The invention is also useful with coils of different configurations, including those that are also disclosed in the same patent application, as well as conventional coils of uniform winding density. The configuration of the magnet assembly can vary as well.

Further variations and embodiments will be apparent to those skilled in the art of moving coil actuators who have studied the drawings and descriptions offered above. In addition to variations in the configurations and geometries of the magnet assembly, coil and coil carrier, for example, a wide range of operating conditions and materials of construction, all within the scope of this invention, will be readily apparent to the skilled engineer.

What is claimed is:

1. A moving coil actuator for scanning a scanning area, said actuator comprising:
   a carrier with a coiled electrical conductor mounted thereto;
   a power source connected to said coiled electrical conductor to produce an electric current periodically alternating in direction through said conductor;
   a magnet assembly comprising magnetic poles separated by a gap that is sized to receive said coiled electrical conductor and to allow said carrier and coiled electrical conductor a range of reciprocating motion along a linear direction relative to said magnet assembly in response to said electric current; and
   means for moving said magnet assembly between positions along a path of travel parallel to said linear direction and, upon moving said magnet assembly, for shifting said range of reciprocating motion of said carrier and coiled electrical conductor along said travel path by distances equal to the separation between said positions.

2. The moving coil actuator of claim 1 further comprising a shoulder on said carrier to abut said magnet assembly such that said means for moving said magnet assembly moves said magnet assembly and said carrier together when moving said magnet assembly in one direction along said path of travel.

3. The moving coil actuator of claim 1 further comprising a shoulder on said magnet assembly to abut said carrier such that said means for moving said magnet assembly moves said magnet assembly and said carrier together when moving said magnet assembly in one direction along said path of travel.

4. The moving coil actuator of claim 1 further comprising a first shoulder on said carrier to abut said magnet assembly and a second shoulder on said magnet assembly to abut said carrier, such that said means for moving said magnet assembly moves said magnet assembly and said carrier together in either direction along said path of travel.

5. The moving coil actuator of claim 1 wherein said means for moving said magnet assembly is a stepper motor.

6. The moving coil actuator of claim 1 wherein said means for moving said magnet assembly is a dc motor.

7. The moving coil actuator of claim 1 further comprising a sensor to detect the position of said carrier.

8. The moving coil actuator of claim 1 wherein said coiled electrical conductor is comprised of first and second coil regions of first and second winding densities, respectively, separated along said carrier either by no coil or by a coil having a winding density lower than both said first and second winding densities, and said magnetic poles are configured to impose a magnetic flux that is concentrated in a region of length less than the combined lengths of said first and second coil regions.

9. The moving coil actuator of claim 1 wherein said first and second winding densities are approximately equal densities and are separated by a coil having a winding density that is lower than said first and second winding densities.

10. The moving coil actuator of claim 1 wherein said first and second coil regions and said region of concentrated magnetic flux are approximately equal in length.

11. A method for scanning an array of sites with a scanning head affixed to a moving coil actuator, said actuator comprising a carrier with a coiled electrical conductor mounted thereto, a power source connected to said conductor to produce an electric current of alternating direction through said conductor, and a magnet assembly comprising magnetic poles separated by a gap sized to receive said coiled electrical conductor and to allow said coiled electrical conductor to travel in a reciprocating motion along a linear path of travel relative to said magnet assembly in response to said electric current, said method comprising:

(a) with said magnet assembly in a first position, passing an electric current through said conductor to cause said scanning head to travel over a first portion of said array of sites;

(b) moving said magnet assembly to a second position displaced from said first position along a direction parallel to said linear path of travel; and (c) with said magnet assembly in said second position, passing an electric current through said conductor to cause said scanning head to travel over a second portion of said array of sites, steps (a), (b), and (c) collectively causing said scanning head to scan a width of said array equal to the sum of the widths of said first and second portions.

12. The method of claim 11 wherein step (a) comprises passing said alternating current through said conductor in alternating directions to cause said scanning head to travel in a reciprocating motion in a plurality of cycles over said first portion of said array of sites prior to step (b), and step (c) comprises passing said alternating current through said conductor in alternating directions to cause said scanning head to travel in a reciprocating motion in a plurality of cycles over said second portion of said array of sites.

13. The method of claim 11 further comprising performing steps (b) and (c) at least once following step (c), each time moving said magnet to positions successively further displaced from said first position and causing said scanning head to scan additional portions of said array.

14. The method of claim 11 further comprising detecting the position of said carrier during step (b).

* * * * *

UNITED STATES PATENT AND TRADEMARK OFFICE
CERTIFICATE OF CORRECTION

PATENT NO. : 7,661,593 B2  Page 1 of 1
APPLICATION NO. : 11/291423
DATED : February 16, 2010
INVENTOR(S) : Daniel Y. Chu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1113 days.

Signed and Sealed this

Thirtieth Day of November, 2010

David J. Kappos
*Director of the United States Patent and Trademark Office*